June 16, 1936.  W. T. HEDLUND  2,044,609
REFRIGERATION
Filed Jan. 12, 1929
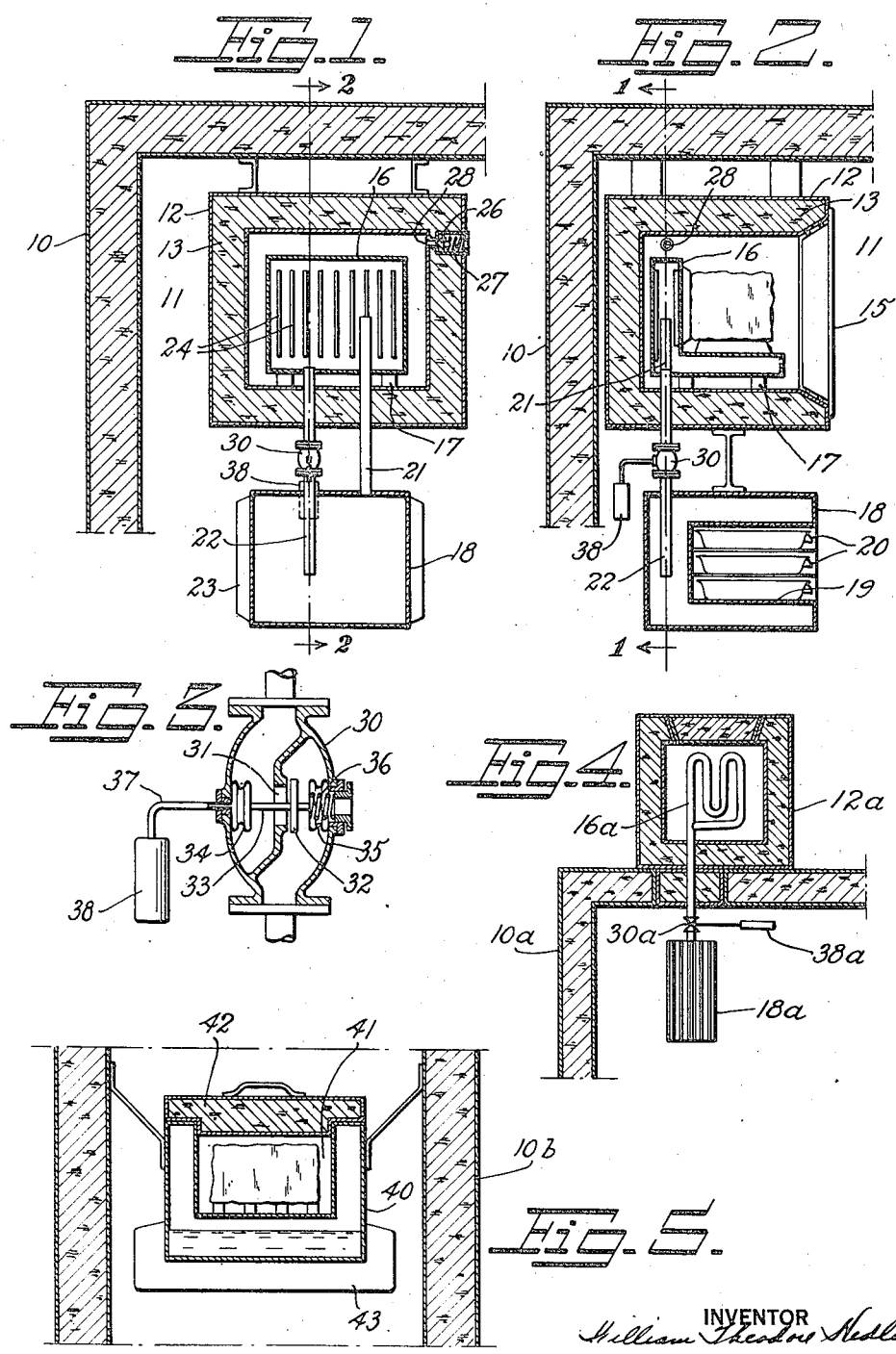
INVENTOR
William Theodore Hedlund Patented June 16, 1936

2,044,609

UNITED STATES PATENT OFFICE 2,044,609

REFRIGERATION

William Theodore Hedlund, Mount Vernon, N. Y., assignor to Servel, Inc., New York, N. Y., a corporation of Delaware Application January 12, 1929, Serial No. 332,162

22 Claims. (Cl. 62—91.5)

My invention relates to the art of refrigeration and particularly to refrigeration by a cold body of low temperature. Such a cold body is solidified carbon dioxide.

Solidified carbon dioxide, which will be termed dry ice in this specification for ease of description, has a very low temperature. Its temperature is lower than minus one hundred degrees below zero Fahrenheit. To use such a substance in a refrigerator cabinet requires caution. Unrestricted sublimation of dry ice in a refrigerator cabinet would soon freeze up food.

I believe it has been suggested to confine the dry ice in a domestic refrigerator to slow up its sublimation by placing it in insulation with a series of openings. The conditions of use of a refrigerator cabinet are so varied that it would hardly be logical to expect results from an uncontrolled simple insulated container with merely one or more small openings. If the openings are so small as to substantially prevent sublimation in the night time when there is no use of the refrigerator, then there would not be sufficient opening for adequate refrigeration in the daytime.

The thought readily suggests itself that a thermostatically operated valve may be used to control the opening of an insulated container holding dry ice. In view of the low temperature of dry ice, this is not the best solution because the regulation would have to be too delicate.

My invention proposes to provide an efficient utilization of this type of substance with a device which is practical and which gives accurate control without danger of too low temperatures. The invention consists principally in the more complete confinement of the dry ice than has hitherto been proposed and the utilization of a condensation-vaporization cycle for transferring heat from the medium to be cooled to the dry ice.

I do not utilize movement of the carbon dioxide gas to conduct heat but completely confine the dry ice and form a layer of stagnant carbon dioxide gas around the dry ice. Thus I get the advantage of the insulating property of the carbon dioxide gas while obtaining a controllable conveyance of heat to the dry ice in such variance of rate that a constant temperature may be obtained in the medium to be cooled. The conveyance of heat is proportional to the demand for refrigeration without, or substantially without, causing a break or disturbance in the carbon dioxide gas jacket.

Referring to the accompanying drawing, showing various ways of carrying out the invention:

Fig. 1 is a cross-sectional view taken on the line 1—1 of Fig. 2 through a refrigerator cabinet embodying my invention; Fig. 2 is a cross-sectional view taken on the line 2—2 of Fig. 1; Fig. 3 shows, in cross-section, a thermostatically controlled valve forming part of the arrangement of Figs. 1 and 2; Fig. 4 shows another embodiment of the invention; and Fig. 5 shows still another embodiment of the invention.

Referring to Fig. 1, reference character 10 designates generally a refrigerator cabinet having a food space 11 constituting the medium to be cooled. Within the food space 11 is an insulated chamber 12 comprising double walls insulated by cork or the like 13. In the front of chamber 12 is a door 15, also suitably insulated. The door is properly hinged and provided with insulation strips to make a tight fit when closed. This door serves for the introduction of a cake or bag of dry ice or the like.

Within chamber 12 is an L-shaped condenser member 16. The open part of the L is accessible to door 15 so that a cake of dry ice may set on this member. This condenser member is spaced away from the inner walls of the chamber 12, resting on suitable supports 17.

Outside chamber 12 and below it and within the food space is an evaporation member 18 which is of box-like shape having a central pocket 19 for the reception of one or more ice trays 20. A vapor conduit 21 extends from the upper part of evaporation member 18 to within condenser member 16. A liquid conduit 22 extends from the bottom of condenser member 16 down to within evaporation member 18.

Condenser member 16, evaporation member 18 and conduits 21 and 22 form a hermetically sealed circuit. This circuit contains a suitable fluid having a low boiling point such as butane or methylchloride. The amount of liquid should be considerably less than the volumetric capacity of the circuit, for instance one-tenth or less of the volumetric capacity.

In operation, the low temperature in chamber 12, due to the presence of the dry ice, condenses the volatile fluid, let us say butane, in condenser member 16. Liquid butane flows down into member 18 through pipe 22 and is evaporated due to the higher temperature in the food space. The vapor passes up through conduit 21 and is again condensed. Thus there is an evaporation-condensation cycle in which liquid on a surface adjacent the medium to be cooled is evaporated and is condensed on a surface adjacent a body of dry ice. The evaporation of the butane in member 18 takes up heat from the food space, and, by so doing, produces refrigeration. The condensation of butane in member 16 gives up heat to the dry ice which sublimes, that is, gasifies directly from solid form, to an extent corresponding to the heat transfer. Ribs 23 and 24 may be provided inside and outside the members 16 and 18 to increase heat transfer.

As the dry ice sublimes, carbon dioxide gas is given off and this gas forms an insulating layer around the dry ice. To let the carbon dioxide gas out of chamber 12, I provide a valve 26, in the nature of a relief valve, in a passage 28 through the insulated wall of chamber 12, which opens when the pressure of carbon dioxide gas in chamber 12 reaches a predetermined value determined by the tension of a spring 27 acting to hold the valve closed. The carbon dioxide gas may pass into the food space or may be carried through a pipe connected to the relief valve out from the refrigerator to the open air.

Valve 26 is not essential to carrying out the invention since, in most cases, there would be sufficient leakage past door 15 to permit the excess carbon dioxide gas to leave chamber 12 and yet provide a stagnant layer of carbon dioxide gas around the cake of dry ice to get the desired insulating effect. It will be understood that this insulating effect of the carbon dioxide gas is not, in this case, a complete insulation but that it serves principally as a retarding effect on heat transfer. The lower the freezing point of the fluid used in the circuit, the less the need for carbon dioxide gas insulation between the body of dry ice and the condensation surface.

If all the butane were collected as liquid in condenser member 16, there would be no heat transfer and no refrigeration would take place. Therefore by controlling flow of liquid through conduit 22, regulation can be obtained to vary the rate of refrigeration all the way from zero to maximum. The maximum possible heat transfer can be made of great magnitude. Consequently, it is possible by this condensation-evaporation cycle to obtain an unusually wide range of refrigeration capacity.

To accomplish the regulation, I place a valve 30 in conduit 22. Valve 30 may be of various types. I have shown one type in detail in Fig. 3 to illustrate the fact that a hermetically sealed valve and control therefor is preferred.

Referring more specifically to Fig. 3, the valve comprises a body in which is a valve opening 31 controlled by a valve disk 32 mounted on a stem 33. The valve stem is connected between two bellows or sylphons 34 and 35. An adjustable spring 36 acts against bellows 35. The inside of bellows 34 is connected to a tube 37 and a bulb 38 containing a volatile fluid such as methylchloride or sulphur dioxide. Bulb 38 is placed in the food space.

The temperature responsive valve 30 operates to maintain a constant temperature at the bulb. When the temperature in the food space rises, the fluid in bulb 38 and tube 37 expands, moving valve disk 32 to the right (as shown) causing an increased flow of liquid butane through conduit 22 and into the evaporation member 18 to take up more heat by evaporation. Conversely a drop in temperature at the bulb closes the valve more or less to decrease the rate of flow of liquid butane into the evaporation member.

It will be noted that the circuit as well as the valve mechanism is entirely hermetically sealed.

In Fig. 4, I have shown another form of the invention. The closed chamber 12a corresponding to the chamber 12 of Fig. 1 is placed on top of the refrigerator cabinet 10a. The whole unit is removable through the top of the refrigerator cabinet. Only a single conduit connects the condenser member 16a with the evaporation member 18a. In this circuit, the cycle fluid, which may be propane, flows up and down as vapor and liquid respectively in the same conduit. This conduit is controlled by a valve 30a movable in response to variations of temperature of bulb 38a.

It is obvious that in Fig. 1 any shape of condenser member would do and any shape of evaporation member would do. In Fig. 4, the condenser member is shown as a loop of pipe and the evaporation member as a vertically extending ribbed cylinder.

In Fig. 5 is shown a double walled vessel 40 having an inset wall 41 adapted to hold a cake of dry ice or the like. No insulation of cork or the like is provided except in the insulated cover 42 which closes the top of well 41. Fins 43 are attached to vessel 40 to give extended surface. The unit is placed inside refrigerator cabinet 10b. Propane or butane and the like may also be used in this unit. Butane (for example) evaporates adjacent the outside surface of the vessel 40 adjacent the food space and condenses on the inside surface adjacent the dry ice.

In this arrangement I prefer to introduce an inert gas such as hydrogen into the vessel 40. This will give a minimum total pressure in vessel 40, preventing boiling of the propane at low temperatures. This will therefore serve as a regulator to prevent the temperature in the food space from falling too low.

An inert gas may also be introduced into the circuits of the preceding embodiments.

It will be understood that the invention may be embodied in a great variety of forms and that the invention is not to be limited by the disclosure except as defined by the appended claims taken in connection with the prior art.

Having thus described my invention, what I claim is:

1. In the art of refrigerating by vaporization of solidified carbon dioxide, the improvement which consists in surrounding solidified carbon dioxide with walls so constructed and insulated as to prevent the obtaining of adequate refrigerating effect by movement of carbon dioxide vapor or conduction through said walls, and limiting the production of utilizable cooling effect by providing one or more limiting paths of flow for a separate vaporizable fluid and condensing said fluid in heat exchange relation with the solid carbon dioxide and evaporating said fluid in heat exchange relation with an object to be cooled in accordance with demand for refrigeration of said object, whereby said carbon dioxide is essentially prevented from productive cooling except through such path or paths.

2. In a refrigerating apparatus, an enclosure for holding solidified carbon dioxide surrounded by walls so constructed and insulated as to prevent the obtaining of adequate refrigerating effect by movement of carbon dioxide vapor or conduction through said walls, and members containing a volatile fluid and forming a closed cycle for vaporization and condensation of such volatile fluid providing a limited effective heat transfer system between the carbon dioxide and a body to be refrigerated, said members being so constructed and arranged that said volatile fluid is condensed and vaporized in accordance with demand for refrigeration, and whereby carbon dioxide in said enclosure is substantially prevented from productive cooling except by such condensation and evaporation.

3. Refrigerating apparatus comprising an enclosed insulated chamber adapted to hold solidified carbon dioxide or the like, a hermetically sealed vaporization-condensation circuit partly within and partly without said chamber, means for permitting exit of gas from said chamber and temperature responsive means to control flow of fluid in said circuit.

4. Refrigerating apparatus comprising an insulated chamber, a condenser member within said chamber adapted to hold a cake of dry ice or the like thereon, an evaporation member outside said chamber and below the same comprising a pocket for holding one or more ice trays, conduit means connecting the condensation member with the evaporation member, a valve in the conduit means and a thermostat for operating the valve to increase flow on rise of temperature and decrease flow on fall of temperature, the circuit formed by the condenser member, the evaporation member and the conduit means being hermetically sealed.

5. That improvement in the art of refrigeration which consists in evaporating a liquid on a surface adjacent a medium to be cooled, condensing the fluid on a surface adjacent a body of solidified carbon dioxide, forming a layer of carbon dioxide gas between the body of carbon dioxide and the condensing surface and regulating the flow of fluid between the condensing surface and the evaporating surface in response to temperature of the medium to be cooled.

6. Refrigerating apparatus comprising an enclosed insulated chamber, a condenser member within said chamber adapted to hold a cake of dry ice or the like thereon, an evaporation member outside said chamber and below the same comprising a pocket for holding one or more ice trays, and conduit means connecting the condensation member with the evaporation member.

7. Refrigerating apparatus comprising an enclosed insulated chamber, a condenser member within said chamber adapted to hold a cake of dry ice or the like thereon, an evaporation member outside said chamber and below the same comprising a pocket for holding one or more ice trays, and conduit means connecting the condensation member with the evaporation member, the circuit formed by the condenser member, the evaporation member and the conduit means being hermetically sealed.

8. Refrigerating apparatus comprising an insulated chamber, a condensation member within said chamber constructed to support a cake of solidified carbon dioxide thereon and give up heat thereto, an evaporation member outside said chamber, conduit means connecting the condensation member with the evaporation member, a valve in said conduit means, and a thermostat for operating the valve to increase flow on rise of temperature and decrease flow on fall of temperature, the circuit formed by the condensation member, the evaporation member and the conduit means being hermetically sealed.

9. The method of modifying the refrigerative effect of solid carbon dioxide on a condenser that has a vertical condenser portion and a part extending therefrom which includes conducting the heat from the condenser through a path including said extending part and upon which the solid carbon dioxide is supported.

10. A refrigerating cabinet having a compartment to be cooled, said compartment containing a cooling source and an element to be cooled by said cooling source, a conduit in heat exchange relation with said element and with said cooling source, and a volatile fluid partly filling said conduit.

11. A refrigerating cabinet having a compartment to be cooled, a cooling source in said compartment, an element in said compartment to be cooled by said cooling source, a conduit in heat exchange relation with said element and with said cooling source and a volatile fluid partly filling said conduit.

12. Refrigerating apparatus for producing refrigeration by means of solidified carbon dioxide comprising a wall structure including well-insulated walls and forming a substantially gas-tight chamber adapted to hold solidified carbon dioxide, a condensation member associated with said chamber and adapted to give up heat to solidified carbon dioxide therein, an evaporation member outside said chamber in heat exchange relation with a body to be cooled, conduit means connecting the condensation member with the evaporation member, said condensation member and said evaporation member and said conduit means being partially filled with a volatile liquid adapted to condense in the condensation member and evaporate in said evaporation member, a valve in the conduit means, and a thermostat for controlling the valve to increase flow on rise of temperature and decrease flow on fall of temperature, the system including the space for the volatile liquid in the condensation member, the evaporation member and the conduit means being hermetically sealed.

13. Refrigerating apparatus for producing refrigeration by means of solidified carbon dioxide comprising a wall structure including well-insulated walls and forming a substantially gas-tight chamber adapted to hold solidified carbon dioxide, a condensation member associated with said chamber and adapted to give up heat to solidified carbon dioxide therein, an evaporation member outside said chamber in heat exchange relation with a body to be cooled, conduit means connecting the condensation member with the evaporation member, said condensation member and said evaporation member and said conduit means being partially filled with a volatile liquid adapted to condense in the condensation member and evaporate in the evaporation member, and a valve in the conduit means, the system including the space for the volatile liquid in the condensation member, the evaporation member and the conduit means being hermetically sealed, and means external to the hermetically sealed circuit for controlling said valve to control flow in said conduit means.

14. Refrigerating apparatus for producing refrigeration by means of solidified carbon dioxide comprising a wall structure including well insulated walls and forming a substantially gas-tight chamber adapted to hold solidified carbon dioxide, a condensation member associated with said chamber and adapted to give up heat to solidified carbon dioxide therein, an evaporation member outside said chamber in heat exchange relation with a body to be cooled, conduit means connecting the condensation member with the evaporation member, said condensation member and said evaporation member being partially filled with a volatile liquid adapted to condense in the condensation member and evaporate in the evaporation member, a valve in the conduit means, and a thermostat for controlling the valve to increase flow on rise of temperature and decrease flow on fall of temperature, the circuit formed by the condensation member, the evaporation member and the conduit means being hermetically sealed, said thermostat including a fluid hermetically sealed with respect to fluid in said conduit means.

15. In refrigerating apparatus, in combination, means forming a cooling chamber for articles to be cooled, a container disposed within said chamber and holding a volatile refrigerant, a condensing chamber situated above said first-mentioned chamber, means thermally insulating said condensing chamber from said first-mentioned chamber, a low temperature refrigerant disposed in said condensing chamber, the temperature of said refrigerant being considerably below the temperature to be maintained in said first-mentioned chamber, a single conduit connecting said container to said condensing chamber to conduct vapor from said container to said condensing chamber, a valve disposed in said last-mentioned means and adapted to control said flow of said vapor, and means responsive to the temperature of said space for controlling the operation of said valve.

16. In refrigerating apparatus, in combination, means forming a space to be maintained at a certain temperature, containing means in thermal contact with said space for a volatile liquid, a condensing chamber thermally insulated from said space, a single conduit connecting said condensing chamber with said containing means, and a valve for controlling the flow of liquid or vapor through said conduit, said valve being responsive to the temperature of said space.

17. In refrigeration apparatus, in combination, means forming a space to be maintained at a desired temperature, a container for volatile liquid in thermal exchange relation with said space, a condenser thermally insulated from said space, means for cooling said condenser including a receptacle containing solid carbon dioxide, a single conduit connecting said condenser and said container, and automatic means including a valve for regulating flow of fluid through said conduit to maintain said space at said desired temperature.

18. Apparatus as set forth in claim 10 including temperature responsive means for controlling flow in said conduit.

19. Apparatus as set forth in claim 10 in which the cooling source is a container for solidified carbon dioxide.

20. Apparatus as set forth in claim 10 in which the cooling source is a thermally insulated receptacle for solidified carbon dioxide and including automatic means for regulating passage of fluid in said conduit to maintain said compartment at a desired temperature.

21. In refrigeration apparatus, in combination, a container having therein a volatile liquid, means forming a chamber for articles to be cooled about said container, a valve for controlling the escape of vapor from said container, means controlling said valve in accordance with the temperature within said chamber, means forming a second chamber communicating with said valve, and means for condensing vapor in said second chamber, said means including a receptacle containing a frozen body and having its interior free from connection with the interior of said second chamber.

22. In refrigeration apparatus, in combination, a chamber for articles to be cooled, a container of volatile liquid in thermal exchange relation with said chamber, said container acting as a cooling member for said chamber upon evaporation of said volatile liquid, a second chamber thermally insulated from said first chamber, a cooling agent in thermal exchange relation with said second chamber, conducting means connecting said container with said second chamber to permit evaporation of said volatile liquid by leading the vapor resulting from said evaporation to said second chamber for condensation by said cooling agent, said conducting means acting to lead condensed fluid back to said container from said second chamber, and thermostatic means in said first chamber for controlling the action of said conducting means.

WILLIAM THEODORE HEDLUND.